April 30, 1968 A. E. ZIERICK 3,380,320
HYDRAULIC SUPER-CHARGED VARIABLE TRANSMISSION
Filed Dec. 6, 1965 4 Sheets-Sheet 1

INVENTOR
Ambrose E. Zierick

INVENTOR
Ambrose E. Zierick

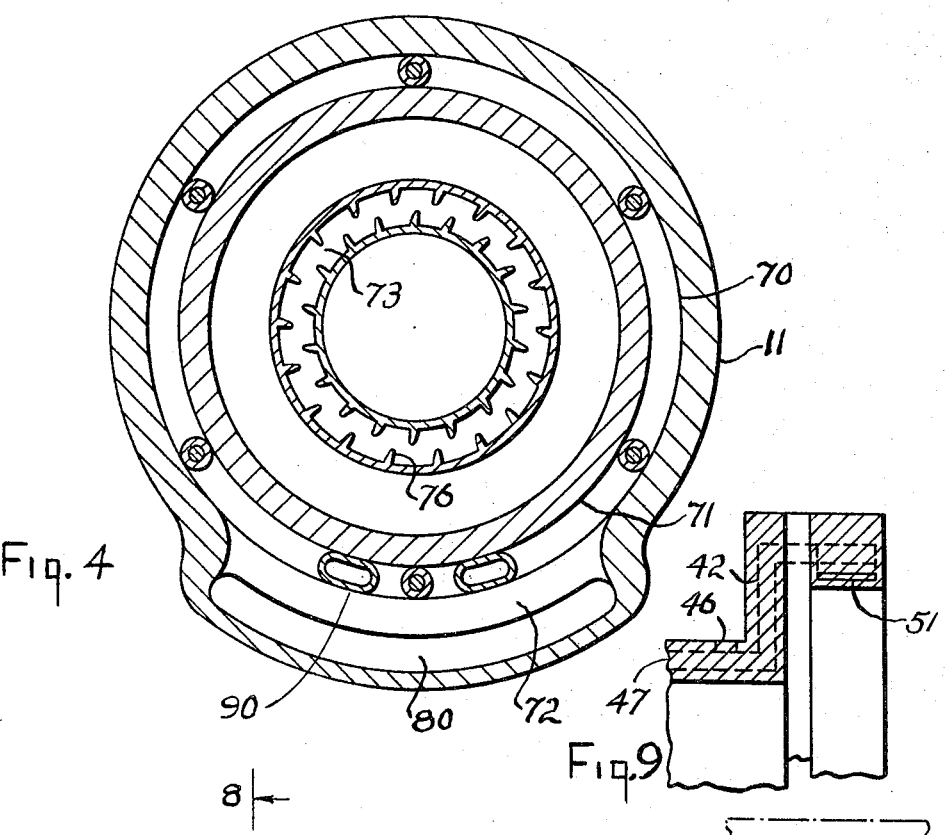
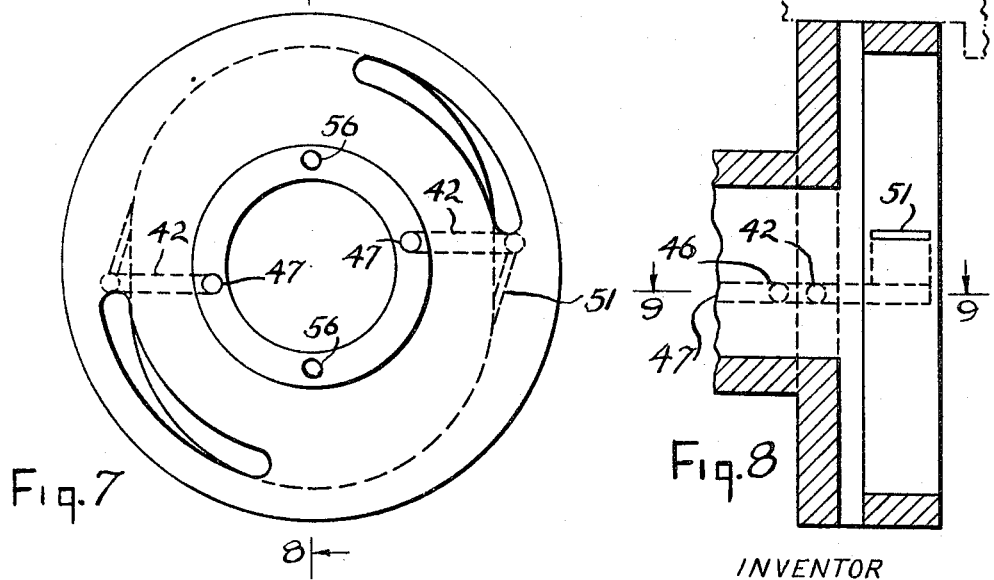

INVENTOR
Ambrose E. Zierick

3,380,320
HYDRAULIC SUPER-CHARGED VARIABLE TRANSMISSION
Ambrose E. Zierick, 5700 Arlington Ave., Riverdale, New York, N.Y. 10471
Filed Dec. 6, 1965, Ser. No. 511,734
8 Claims. (Cl. 74—794)

ABSTRACT OF THE DISCLOSURE

An infinitely variable transmission including a fluid pump utilized as a clutch between two elements of a planetary gear set and a fluid impeller connected to the input shaft used to supercharge the pump.

---

Figure 1:
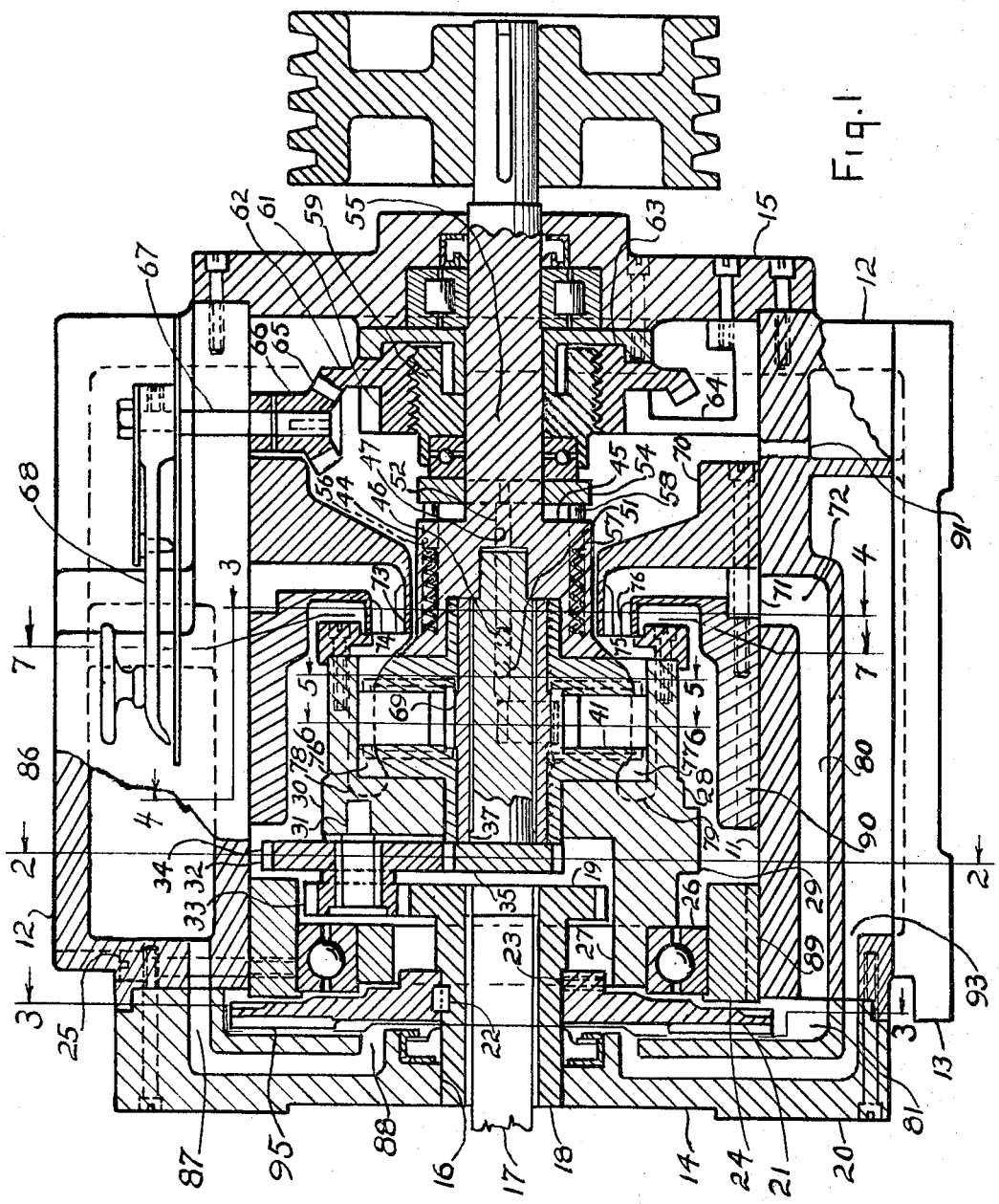

The present invention relates to a hydraulic super-charged variable transmission particularly adapted for use with a constant speed motor, and especially to a hydraulic transmission which combines a planetary gear system with hydraulic clutch, as found in my Patent No. 3,159,058, patented December 1964.

It is the primary object of the present invention to provide a super-charging hydraulic device to boost initial hydraulic pressure entering into the intake ports of a pump, thereby providing a greater torque action to pivot a dynamic fulcrum on the planetary gears for gear ratio and torque increase.

It is a further object of the present invention to provide a variable hydraulic transmission of the character described, which may be advantageously used with and applied to the driving of relatively heavy equipment, as automotive, tractor, machine tools, textile machinery, conveyors, and prime marine power installations.

It is a still further object of the present invention to provide a variable hydraulic transmission, of the character described, which is of relatively uniquely compact, simple, and sturdy construction, and affords greater consistency and flexibility in speed variation.

It is in addition a further object to provide a variable hydraulic transmission to be highly efficient as a power miser with an efficiency of seventy percent greater than any electrical motor having electronic variable speed regulation and forty percent greater than any sheave type, and being almost only half the size.

It is a type of transmission that is unusually obvious in a high speed portable electric drill using a small size drill at high speed, and the inherent convenience in reducing from high speed to a low speed for a large drill requiring tremendous torque increase; without zipping, skipping or slowing down.

The foregoing and other objects and advantages of the variable hydraulic transmission of the present invention will become more readily apparent to those skilled in the art from the embodiment thereof shown in the accompanying drawings, and from the description thereof. It is to be understood, however, that such embodiment is shown by way of illustration only, to make the principles and practice of the invention more readily comprehensible, and without intent of limiting the invention to the specific details therein shown.

Figure 3:
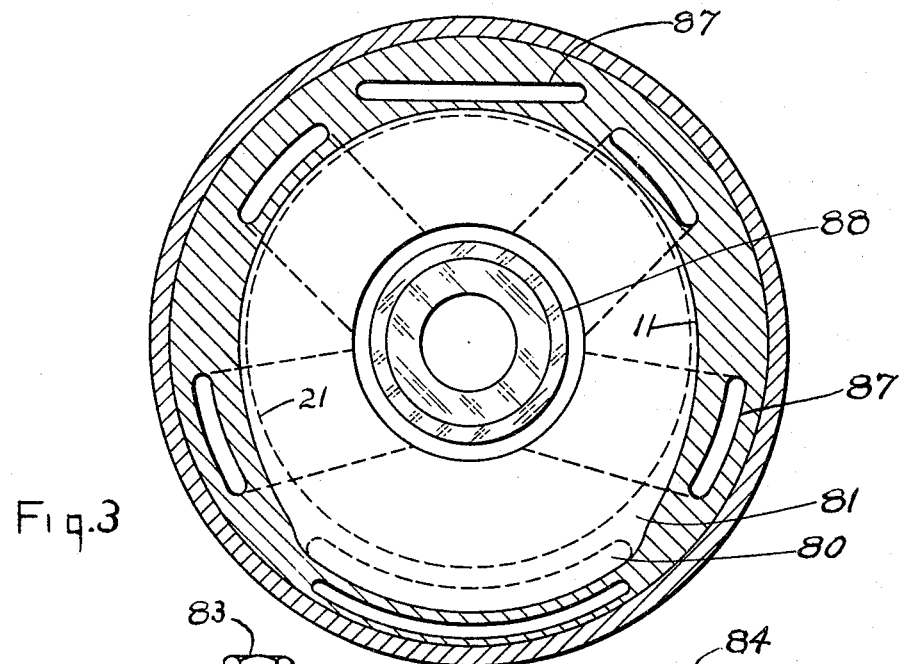
Figure 2:
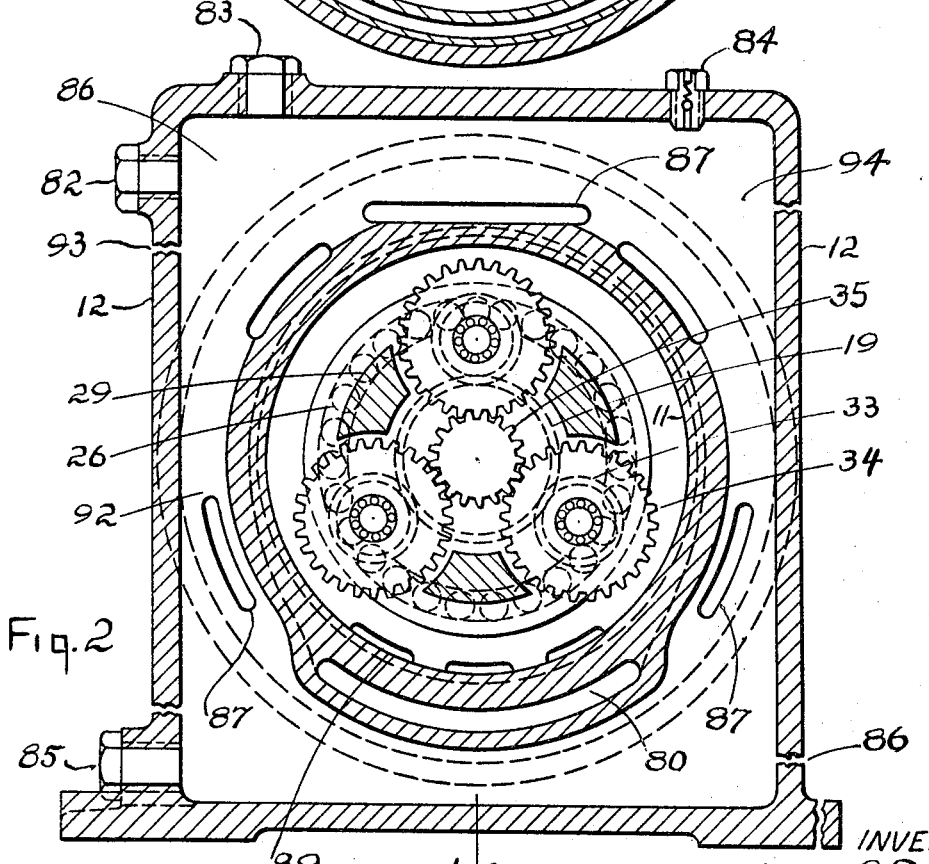
Figure 6:
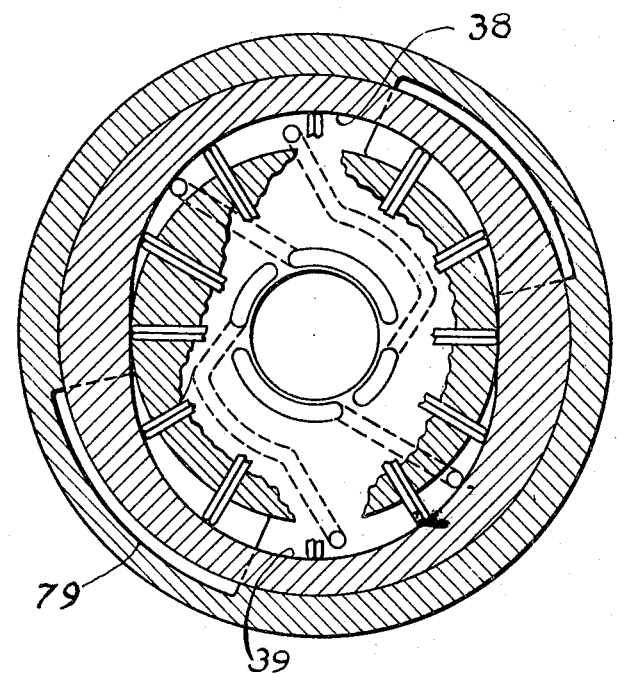
Figure 5:
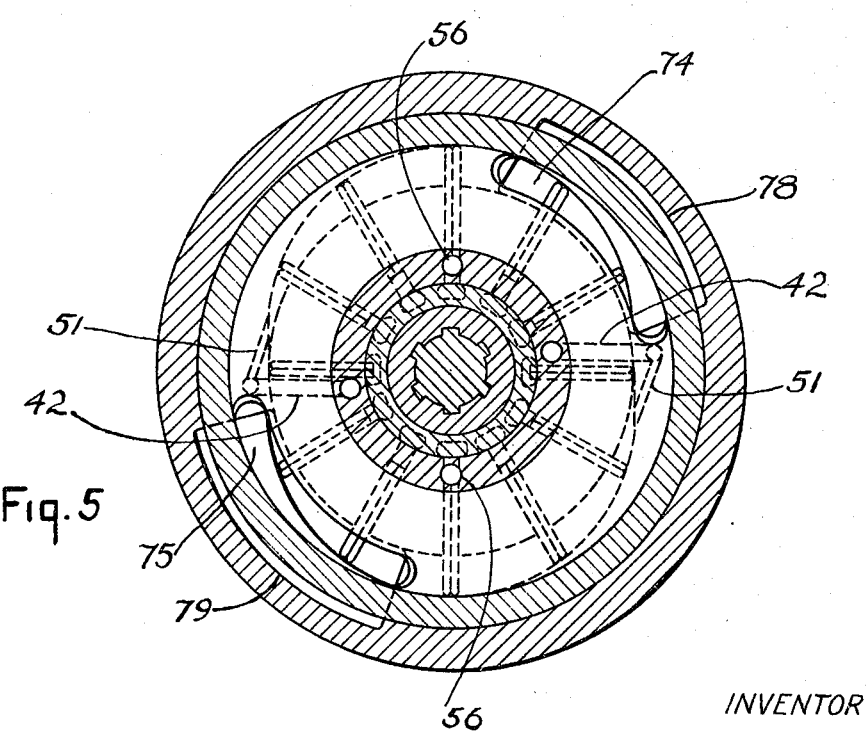

In the drawings:

FIG. 1 is a longitudinal, sectional and partly elevated view through a hydraulic transmission of my invention taken on line 1—1 of FIG. 2;

FIG. 2 is a cross-section taken on line 2—2 of FIG. 1;
FIG. 3 is a cross-section taken on line 3—3 of FIG. 1;
FIG. 4 is a cross-section taken on line 4-3-4 of FIG. 1;
FIG. 5 is a cross-section taken on line 5—5 of FIG. 1;
FIG. 6 is a cross-section taken on line 6—6 of FIG. 1;
FIG. 7 is a cross-section taken on line 7—7 of FIG. 1;
FIG. 8 is a cross-section taken on line 8—8 of FIG. 7;
FIG. 9 is a cross-section taken on line 9—9 of FIG. 8.

The accompanying drawings illustrate a preferred embodiment of the hydraulic transmission with the supercharger of my invention, in which a cylindrical liquid leak proof housing, generally designated as 11, is encompassed with an outer liquid circulating leak proof housing designated as 12, is provided with feet 13, by which it may be supported upon and secured to a desired surface. The housing 12 is formed with end walls 14 and 15 respectively. One of the walls, as 14, is formed with the axial opening 16, through which extends a short end portion of a drivng shaft 17, that is connected to an outside motor (not shown). A sleeve 18 is splined on the driving shaft end 17 and carries, preferably integrally, on its inner end, disposed within the housing 12, a pinion, 19.

Driving shaft 17 is mounted ragidly on a rotative motor bearing (not shown) and is secured by fastening against surfaces 20, providing stability of rotation for pinion 19. Sleeve 18 supports a pump impeller 21, keyed thereon at 22 and secured by set screw 23. A ring 24 is disposed within walls of cylinder 11 and is fastened securely with screw 25. A ball bearing race 26 is fitted within ring 24 and on the inner race of bearing nestles a spider ring 27 which concentrically supports pumps housing cylinder 28 through arms 29 and circular flange 30. The flange 30 of pump housing 28 carries a series of stud spindles 31, that project in the direction of the wall 14 on each of which is rotatably supported a twin satellite gear, each generally designated as 32, and each having, preferably a portion 33 of relatively lesser diameter that meshes with pinion 19 of the driving shaft 17 and a portion of relatively larger diameter 34, that meshes with the pinion 35 carried on the projecting end of rotor shaft 37.

Each of pressure chambers 38 and 39 is provided with a fluid outlet passage 51 formed in walls 41, that lead to a port 42, opening into a duct or recess 47, formed in a wall of cylinder 44 and leading inwardly thereinto from its shoulder 45. A second or outlet port 46 is provided in each recess 47, preferably outwardly of port 51, which forms an opening of a passageway leading to the exterior of the clutch pump into the housing 11.

A plunger 52 is snugly and slidably disposed in each of the recesses 47 for the reciprocal movement therein, to wholly or partly open and close the outlet port 46 thereof.

The plungers 52 project from the recesses 47 and engage in a ring 54 that is rotatably and slidably supported on the reduced extension 55 of the cylinder 44, within the housing 11 and which rotates with the cylinder 44 and the plungers 52. The ring 54 and plungers 52 are so arranged that gradual movement of the ring 54 in the direction of the cylinder shoulder 45 will move the plungers 52 to gradually close the ports 46, to thereby gradually break fluid communication between the interior of the clutch pump through port 51 with the housing 11, whereas gradual movement of the ring 54 away from the cylinder 44 will move plungers 52 to gradually open ports 46 and re-open communication between the interior and exterior of the clutch pump.

Means are provided for normally maintaining the ring 54 in port-opening position. Such means includes other, axially-extending recesses 56, formed in the wall of cylinder 44 and opening in its shoulder 45 adjacent wall 14. The inner portions of recesses 56 carry expansion coil springs 57, and their outer portions house the ends of partly projecting pins 58, that are kept in constant abutment with the ring 54 by the coil springs 57, tending to normally maintain it in port-opening position.

Means are provided for controlling the degree of opening of the outlet or bleeder ports 46. Such means may comprise an externally, preferably multiple, as triple threaded sleeve 59, slidably supported on the reduced end 55 of the cylinder 44, within housing 11, whose threads mesh with corresponding threads on the internal opening of the hub 61, of a gear ring 62, that is rotatably captive within the housing 11, as between rings 63 and 64 fixed, respectively, on wall 15 and the bottom of the stationary housing 11. The teeth 65 of the captive ring 62 are preferably bevelled and mesh with the teeth of a bevel gear 66 mounted on a shaft 67, that is journaled in the wall of the housing 11 and projects therethrough and carried on its projecting end a handle 68, that may be rotated to rotate the captive ring 62 and thereby rotate and slide the sleeve 59 in either inward or outward direction over the driven shaft section 55.

It will be apparent that when handle 68 is turned in one direction, the bevel gear 66 will turn the captive ring 62 to move the threaded sleeve 59 against the ring 54, to move it inwardly so that its plungers 52 will partially or wholly close the port 46, depending on the angle through which the handle 68 is rotated. Conversely, when the handle 68 is rotated in the opposite direction, the threaded sleeve 59 will be moved outwardly, towards the wall 15, and away from the ring 54, so that the latter is outwardly moved by the pressure of springs 57, to withdraw the plungers 52 and partly or fully open ports 46, to permit partial or full bleeding therethrough, depending on the degree of rotation of the handle 68 in the last named direction.

It will also be apparent that when ports 46 are opened, by the rotation of the handle 68, in the appropriate direction, the pressure inside of the clutch pump is reduced due to the relative free flow of fluid therein, so that the rotation of the clutch pump is slowed down relative to the rotation of the driving shaft 17. However, when the pressure is at maximum, namely, when the flow of fluid through the clutch pump is inhibited by the closing of ports 46, the clutch cam and housing will turn at substantially the same speed as the rotor 69 and rotor shaft 37 upon which it is splined. The latter, in turn, will rotate at the speed of the driving shaft 17 when the pressure is a maximum, but faster than the shaft 17 when the satellite gears 34 rotate in place without rotation around flange 30.

Within cylinder 11 there resides a super-charger 70 having an annular slot chamber 71 which extends around the entire circumference and is congruous and in register with slot opening 72 of cylinder 11. Slot opening 72 of cylinder 11, FIG. 7, extends less than a quarter of the circumference where it is in register with cylinder 11. The rest of the annular slot chamber 71 is blocked off or closed by cylinder 11 to make a seal tight annular chamber.

The central portion of super-charger 70 has an annular discharge ring mouth 73 which is in stationary register with the rotating intake ports 74 and 75 of clutch pump. Fins 76 residing in the discharge ring mouth 73 tend to keep the fluid from revolving too freely and flow more axially.

In addition, the ports 76 and 77 are super-charged from the same source of flow through a confluence with outer by-pass ducts 78 and 79, FIG. 5, respectively. Supercharger 70 with discharge ring mouth 73 is in fluid communication through duct 80 and annular centrifugal receiving chamber 81. Impeller 21 rotated by motor shaft 17 at a constant speed centrifugally discharges fluid into a centrifugal receiving chamber 81, at a pressure of 100 lbs. per sq. inch more or less in accordance with receiving fluid at volumetric capacity and the efficient passage of it.

In FIG. 2 normally the fluid level is about even with plug 82 having been filled through top plug 83 and any excessive ambient temperature pressure is released through air vent 84, which is set at a pre-set minimum pressure. Clean out plug 85 is normally at the lowest extremity although housing 12 can be designed for any height convenient for dissipating heat requirements. In FIG. 2 truncated points 86 and 93 are shortened for convenience of illustration. On FIG. 1, speed control handle 68 may be raised for convenience of operation.

The fluid level plug 82, FIG. 2 is superimposed (not shown) in chamber 86, FIG. 1, and gravity allows fluid to flow through duct 87, towards inner annular recessed groove 88 to feed revolving radial blades 95 on impeller 21 for super-charging into pump housing through ducts 81 and 80 into ports 74 and 75 and the rear ports 76 and 77 respectively, through by-pass confluence ducts 78 and 79 respectively.

When pump housing 30 and planetary gears 34 revolve causing a frictional whirlwind action, the limited clearance spacing in cylinder 11 forces the fluid out of the latter through ducts 89, 90 and 91 back into fluid storage chamber 86 up through side chambers 92 and 94, FIG. 2. This arrangement makes a complete cycle of oil flow for high speed performance and cavitation of the vanes in the pump housing is at a minimum.

This completes the description of one embodiment of the stationary hydraulic transmission with super-charging a sliding vane pump of the present invention. It will be readily apparent that numerous variations and modifications may be made in such stationary hydraulic transmission by anyone skilled in the art, in accordance with the principles of the invention hereinabove set forth, without the exercise of any inventive ingenuity. I desire, therefore, to be protected for any and all such variations and modifications that may be made within the spirit of the invention and the scope of the claims hereto appended.

What I claim is:

1. The stationary hydraulic super-charged transmission comprising, in combination, a stationary liquid-tight housing having slot openings, a driving shaft extending into said housing, the inwardly-projecting shaft of said driving shaft having a fluid impeller and pinion connected thereon; a fluid clutch pump within said housing, said pump including a cylinder having a driven shaft connected thereto at one end thereof, said cylinder and said driven shaft in axial alignment with said driving shaft, said driven shaft rotatably supported on said housing; a pump rotor housing including a cam ring axially mounted on said cylinder for rotation therewith; a rotor including radially-displaceable vanes and fluid ports within said pump rotor housing, annular recessed ports in said rotor housing, said rotor including fluid ports and a shaft rotatably disposed within said cylinder and extending towards said driving shaft, said rotor shaft having a pinion connected to its end adjacent said driving shaft; planetary gears mounted on said cylinder adjacent said driving shaft, rotatable means concentric with said driving shaft supporting said cylinder end, each of said planetary gears having a section thereof meshing with said driving shaft and a section meshing with said rotor shaft pinion, a circular hollow supercharging means congruously disposed on the inner periphery of said housing and concentrically adjacent to an opposite end wall of said rotor housing, comprising an annular ring mouth openly projecting into annular recessed ports of said pump rotor housing, a recessed hollow portion of said super-charging means to be in register with said recessed ports in said housing, a confluent fluid duct means integrally disposed from said ports in said housing to an impeller mouth opening onto said fluid impeller; said fluid impeller mouth opening into said fluid duct means, said recessed ports in said housing, and said annular ring mouth tending to contribute pumped fluid into said annular recessed ports of said pump rotor housing while the latter rotates.

2. The stationary hydraulic super-charged transmission of claim 1, wherein said fluid clutch pump having a fluid passage provided therein from said pump rotor housing to said stationary housing, said passage extending through the wall of said cylinder and having an inlet port into said cylinder and an outlet port from said cylinder, means rotatable with said cylinder for adjustably opening and closing one of said passage ports, and means extending through said stationary housing for adjustably moving said port closing and opening means.

3. The stationary hydraulic super-charged transmission of claim 2, wherein, said inward projecting drive shaft having said fluid impeller mounted thereon, a wall recess and adjacent wall keeping said fluid impeller in rotating confinement, fluid ducts from said outer liquid tight housing leading to an annular fluid recess, said fluid impeller having radial disposed blades that rotate concentrically adjacent to said annular fluid recess, said fluid ducts from said outer liquid tight housing, passing gravity flow liquid to said inner annular fluid recess onto said impeller blades for contrifugal discharge through the duct means to said super-charging means, to super-charge said pump rotor housing.

4. The stationary hydraulic super-charged transmission of claim 1, wherein said super-charging means having said annular ring mouth opening includes fins disposed on the internal circumference of smaller diameter of said ring mouth, additional fins are disposed on the internal circumference of larger diameter of said ring mouth, said fins being axial in the direction with fluid flow, said fluid flow tending to maintain said axial direction towards said rotating recessed ports of said pump rotor housing, therefore said fluid flow curving through said rotating annular recess into said rotative ports for pressurizing said pressure chambers in said pump rotor housing.

5. The stationary hydraulic super-charged transmission of claim 4, wherein said annular recessed ports of said pump rotor housing having an outer-passage means for fluid flow to charge said compression chamber of said pump rotor housing through said ports from either side.

6. The stationary hydraulic super-charged transmission of claim 2, wherein said stationary liquid tight housing comprises an inner cylindrical wall enclosing said driving shaft with said impeller and said pinions, said planetary gears, said fluid clutch pump, said super-charging; means for regulating fluid discharge from said fluid clutch pump; aforesaid liquid tight housing having an outer liquid tight wall housing surrounding the former; connecting fluid ducts, from said liquid tight housing to said outer wall liquid tight housing, for re-circulating fluid back into said fluid impeller and be pumped back again into said super-charging means for charging said clutch pump, said fluid to be in continuous cycle of circulation.

7. The stationary hydraulic super-charged transmission of claim 2, wherein said driving shaft extends into said housing, said fluid impeller and said pinion are adjacently located thereon, oil retainer disposed inwardly of said housing, a rotatable support means for said shaft located in said housing.

8. The stationary hydraulic super-charged transmission of claim 1, wherein said planetary gears mounted on said cylinder having integrally a series of spider leg support means, an integrally flanged ring supported by said spider leg support means, ball bearing race exteriorly located on said flange ring, said ball bearing enclosed within a cylindrical ring, the latter encompassed concentrically within said housing for axial alignment support.

References Cited
UNITED STATES PATENTS

| | | | |
|---|---|---|---|
| 2,932,991 | 4/1960 | Zierick | 74—794 |
| 3,058,557 | 10/1962 | Zierick | 74—794 X |
| 3,139,905 | 7/1964 | Rosaen et al. | 103—5 X |
| 3,158,102 | 11/1964 | Ward | 103—5 |
| 3,159,058 | 12/1964 | Zierick | 74—794 |

DONLEY J. STOCKING, *Primary Examiner.*

THOMAS C. PERRY, *Examiner.*